(12) United States Patent
Sakamoto

(10) Patent No.: US 10,053,092 B2
(45) Date of Patent: Aug. 21, 2018

(54) ROAD ENVIRONMENT RECOGNITION DEVICE, VEHICLE CONTROL DEVICE, AND VEHICLE CONTROL METHOD

(71) Applicant: HONDA MOTOR CO., LTD., Tokyo (JP)

(72) Inventor: Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/135,169

(22) Filed: Apr. 21, 2016

(65) Prior Publication Data

US 2016/0311430 A1 Oct. 27, 2016

(30) Foreign Application Priority Data

Apr. 21, 2015 (JP) ................................ 2015-086641

(51) Int. Cl.
| | |
|---|---|
| *B60W 30/12* | (2006.01) |
| *B60W 10/04* | (2006.01) |
| *B60W 10/18* | (2012.01) |
| *B60W 10/20* | (2006.01) |
| *G06K 9/00* | (2006.01) |

(52) U.S. Cl.
CPC ............ *B60W 30/12* (2013.01); *B60W 10/04* (2013.01); *B60W 10/18* (2013.01); *B60W 10/20* (2013.01); *G06K 9/00798* (2013.01); *B60W 2420/42* (2013.01); *B60W 2420/52* (2013.01); *B60W 2520/06* (2013.01); *B60W 2550/14* (2013.01); *B60W 2600/00* (2013.01); *B60W 2720/24* (2013.01)

(58) Field of Classification Search
CPC ...... B60W 30/12; B60W 10/04; B60W 10/18; B60W 10/20; B60W 2420/42; B60W 2420/52; G06K 9/00798
USPC ........................................................ 701/41
See application file for complete search history.

(56) References Cited

U.S. PATENT DOCUMENTS

| | | | |
|---|---|---|---|
| 7,411,486 B2* | 8/2008 | Gern .................. | B60Q 9/008 340/435 |
| 2010/0228437 A1* | 9/2010 | Hanzawa ............. | B62D 1/28 701/41 |
| 2012/0069185 A1* | 3/2012 | Stein ................ | G06K 9/00798 348/148 |
| 2014/0306844 A1* | 10/2014 | Kim .................. | G01S 13/867 342/385 |
| 2015/0363668 A1* | 12/2015 | Kato ................ | G06K 9/00798 382/104 |

(Continued)

FOREIGN PATENT DOCUMENTS

JP 4047249 B2 2/2008

*Primary Examiner* — Nadeem Odeh
(74) *Attorney, Agent, or Firm* — Westerman, Hattori, Daniels & Adrian, LLP

(57) ABSTRACT

Provided are a road environment recognition device, and a vehicle control device and a vehicle control method employing the road environment recognition device. The road environment recognition device includes a recognition section that recognizes a three dimensional object provided alongside a lane in which the vehicle is positioned, and an imaginary line setting section that sets an imaginary line alongside the three dimensional object recognized by the recognition section and further to the lane side than the three dimensional object, and treats the imaginary line as a lane marker.

4 Claims, 5 Drawing Sheets

(56) References Cited

U.S. PATENT DOCUMENTS

2016/0012300 A1* 1/2016 Tsuruta .............. G06K 9/00798
  382/104
2016/0107640 A1* 4/2016 Takahashi ................ B60T 7/12
  701/41

* cited by examiner

ROAD ENVIRONMENT RECOGNITION DEVICE, VEHICLE CONTROL DEVICE, AND VEHICLE CONTROL METHOD

CROSS REFERENCES TO RELATED APPLICATIONS

The present application claims priority under 35 U.S.C. § 119 to Japanese Patent Application No. 2015-086641, filed Apr. 21, 2015, entitled "Road Environment Recognition Device, Vehicle Control Device, and Vehicle Control Method." The contents of this application are incorporated herein by reference in their entirety.

BACKGROUND

1. Field

The present disclosure relates to a road environment recognition device that recognizes a road environment in front of a vehicle. The present disclosure also relates to a vehicle control device and a vehicle control method that utilize a lane marker recognized by the road environment recognition device to control the vehicle.

2. Description of the Related Art

Recent vehicles are being installed with road environment recognition devices that use cameras and radar to recognize the road environment in front. For example, Japanese Patent No. 4047249 describes (in Claim 6 and paragraphs [0060] to [0065], [0090]) a device that uses information acquired by a camera and/or radar to recognize guardrails and lane markers, and to determine three dimensional bodies that are positioned outside of the guardrails and lane markers as erroneous recognitions, and to exclude them from being subject to recognition.

A vehicle control device exists that control vehicles using a road environment recognition device. The vehicle control device controls the vehicle while recognizing lane markers on either side of a lane using the road environment recognition device. However, there are roads that have a three dimensional object such as a guardrail provided at a lane boundary, and sometimes there are no lane markers provided to such roads. Such a road environment recognition device is not able to recognize lane markers on such roads. The vehicle control device is accordingly not able to control the vehicle.

The device in Japanese Patent No. 4047249 is able to recognize guardrails and lane markers actually provided, but is not able to recognize lane markers in a road not provided with lane markers. Thus a vehicle cannot be controlled on a road not provided with lane markers, even employing the device of Japanese Patent No. 4047249.

SUMMARY

In consideration of the above circumstances, the present application describe a road environment recognition device capable of recognizing lane markers in a road where a three dimensional object is provided, but lane markers are not provided, at a lane boundary. The present application also provides a vehicle control device and a vehicle control method employing such a road environment recognition device.

The present application is a road environment recognition device that recognizes a road environment in front of a vehicle. The road environment recognition device includes a recognition section that recognizes a three dimensional object provided alongside a lane in which the vehicle is positioned, and an imaginary line setting section that sets an imaginary line based on the three dimensional object recognized by the recognition section, and treats the imaginary line as a lane marker.

In the present application, the imaginary line is set based on the three dimensional object provided alongside the lane in which the vehicle is positioned, and the imaginary line is treated as a lane marker. This enables a lane marker (the imaginary line) to be recognized on a road provided at a lane boundary with a three dimensional object, but not provided with a lane marker, enabling vehicle control using lane markers on such a road.

The road environment recognition device according to the present application may further include an imaging section that images in front of the vehicle, wherein the recognition section recognizes the three dimensional object using image information imaged by the imaging section. The imaging section is excellent at detecting the lane marker, and is capable of recognizing the lane marker provided on one side of the lane with high precision. The present application is capable of performing high precision vehicle control using the lane marker provided at one side of the lane and the lane marker (the imaginary line) set at the other side of the lane.

The road environment recognition device according to the present application may further include an electromagnetic wave detector that radiates electromagnetic waves in front of the vehicle and detects reflected waves, wherein the recognition section recognizes the three dimensional object using the image information and reflected wave information detected by the electromagnetic wave detector. The electromagnetic wave detector is excellent at detecting the three dimensional object, and is capable of setting the imaginary line with high precision. The present application is capable of performing high precision vehicle control using the lane marker provided at one side of the lane and the lane marker (the imaginary line) set at the other side of the lane.

The road environment recognition device according to the present application may be configured such that the recognition section excludes other three dimensional bodies present outside of the three dimensional object from being subject to recognition. The present application enables the processing load for recognition to be lightened by reducing the scope subject to recognition.

The road environment recognition device according to the present application may be configured such that the imaginary line setting section sets the imaginary line by using information acquired at plural times. The present application enables a stable imaginary line to be set due to using the information acquired at plural times.

The road environment recognition device according to the present application may be configured in the following manner in cases in which a guardrail is provided facing the three dimensional object across the lane. The recognition section recognizes plural three dimensional object points included in the three dimensional object, and also recognizes plural installation points included in the guardrail. The imaginary line setting section finds a first straight line by straight line approximation using the three dimensional object points and sets a candidate for the imaginary line at a position a first distance away from the first straight line on the lane side, and also finds a second straight line by straight line approximation using the installation points, moves the second straight line by a second distance to the imaginary line candidate side, and corrects the imaginary line candidate using the moved second straight line so as to set the imaginary line. The present application is able to set the imaginary line with high precision due to correcting the imaginary line candidate using the guardrail, which is different from the three dimensional object.

The road environment recognition device according to the present application may be configured such that, in cases in which another lane marker is provided to the lane, the recognition section recognizes the other lane marker, and the imaginary line setting section moves the other lane marker a third distance toward the imaginary line candidate side, and corrects the imaginary line candidate using the moved other lane marker so as to set the imaginary line. The present application is able to set the imaginary line with high precision due to correcting the imaginary line candidate using the lane marker provided in the lane.

The road environment recognition device according to the present application may be configured such that, in cases in which another lane marker is provided to the lane the recognition section recognizes the other lane marker, and the imaginary line setting section excludes any information of straight lines lacking symmetry to the other lane marker, or any information of straight lines further away from the other lane marker than the distance between the other lane marker and the three dimensional object. The present application is able to quickly set the imaginary line due to excluding unrelated information when setting the imaginary line. The word "section" used in this application may mean a physical part or component of computer hardware including a monitor, an imaging device, a controller, a processor, a memory, etc., which is configured to perform intended functions.

A vehicle control device according to the present application includes the road environment recognition device and a vehicle controller. The vehicle controller predicts the direction of progress of the vehicle, and, in cases in which the vehicle is predicted to stray over the imaginary line, takes precautions against the vehicle straying over the imaginary line, and/or makes the vehicle travel alongside the imaginary line.

A vehicle control method of the present application that recognizes a lane marker on a lane in which a vehicle is positioned, and controls the vehicle using the lane marker, may be configured including the following processes. A recognition process of acquiring image information imaged in front of the vehicle, radiating electromagnetic waves in front of the vehicle and acquiring reflected wave information, and using the image information and the reflected wave information to recognize a three dimensional object provided alongside the lane in which the vehicle is positioned. An imaginary line setting process of setting an imaginary line based on the three dimensional object recognized by the recognition process and treating the imaginary line as the lane marker. A vehicle control process of predicting the direction of progress of the vehicle, and, in cases in which the vehicle is predicted to stray over the imaginary line, taking precautions against the vehicle straying over the imaginary line, and/or making the vehicle travel alongside the imaginary line. In the recognition process, other three dimensional bodies present outside the three dimensional object are excluded from being subject to recognition.

The vehicle control method according to the present application may be configured in the following manner in cases in which a guardrail is provided facing the three dimensional object across the lane and another lane marker is provided in the lane. In the recognition process, plural three dimensional object points included in the three dimensional object are recognized, plural installation points included in the guardrail are recognized, and the other lane marker is recognized. In the imaginary line setting process, a first straight line is found by straight line approximation using the three dimensional object points and a candidate for the imaginary line is set at a position a first distance away from the first straight line on the lane side. A second straight line is also found by straight line approximation using the installation points, the second straight line is moved by a second distance to the imaginary line candidate side, the other lane marker is moved a third distance to the imaginary line candidate side, and the imaginary line candidate is corrected using the moved second straight line and the moved other lane marker so as to set the imaginary line. The present application raises the precision of vehicle control due to being able to set the imaginary line with high precision.

DESCRIPTION OF THE PREFERRED EMBODIMENTS

Detailed explanation follows regarding a preferred embodiment of a road environment recognition device and a vehicle control device equipped with the road environment recognition device, according to the present application, with reference to the appended drawings.

Figure 1:
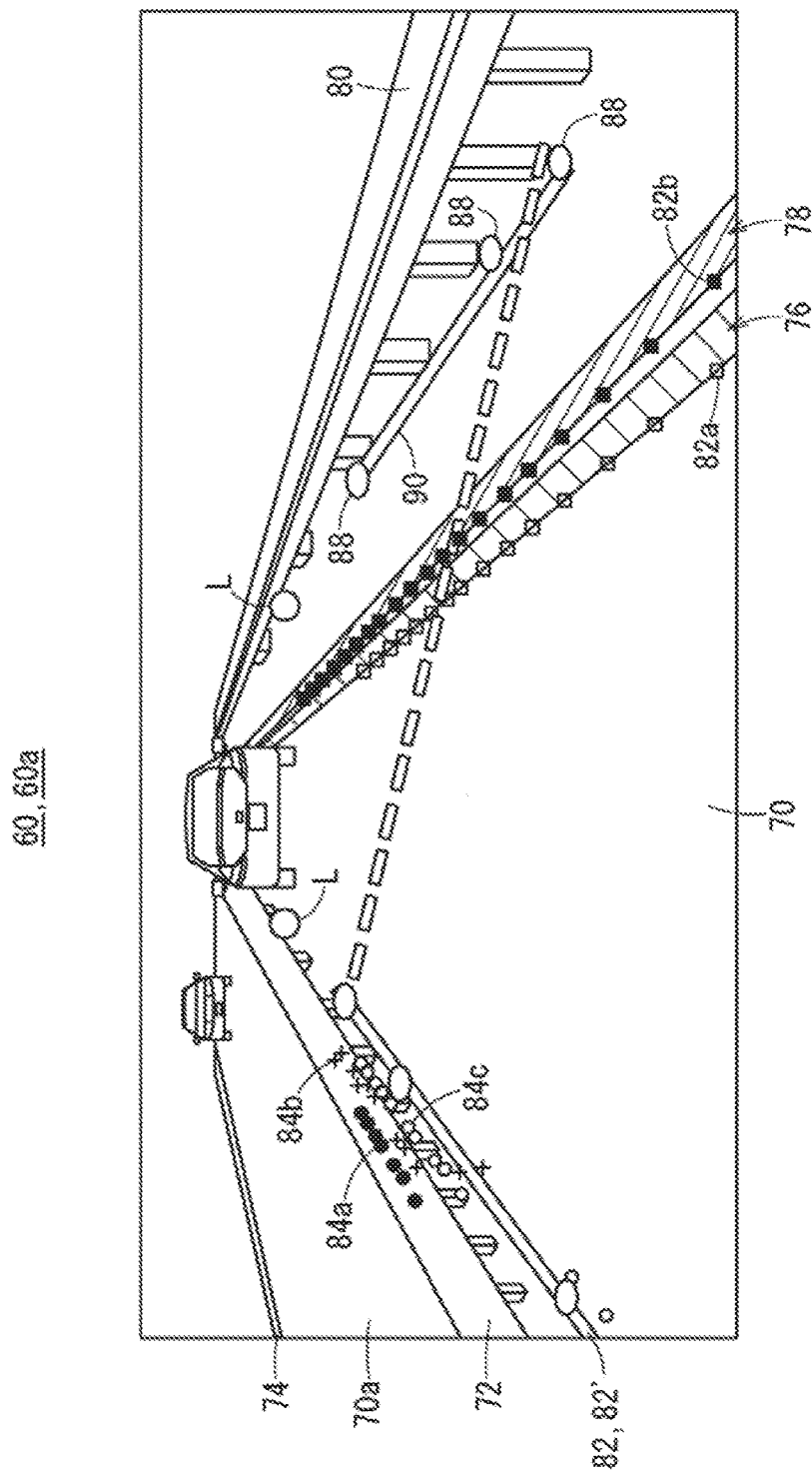
FIG. 1 is an explanatory diagram of image information and reflected wave information in a road environment.

Explanation first follows regarding an example of a road environment on which a vehicle travels in the present embodiment, with reference to FIG. 1. A three dimensional object 72 is provided at the left hand side of a lane 70 on which vehicles travel, alongside the lane 70. The three dimensional object 72 encompasses guardrails, walls, road cones, and poles, etc. FIG. 1 illustrates a guardrail as the three dimensional object 72. A lane marker is not provided at the boundary between the three dimensional object 72 and the lane 70. An opposing lane 70a provided with a lane marker 74 is present on the outside (the left hand side in the drawing) of the three dimensional object 72.

Two lane markers 76, 78 are provided at the right hand side of the lane 70 on which a vehicle travels, alongside the lane 70. A guardrail 80 is provided at the outside of the lane markers 76, 78 (the right hand side in the drawing) so as to face the three dimensional object 72 across the lane 70.

A road environment recognition device 12 explained below is a device that sets an imaginary line 82 alongside the three dimensional object 72. A vehicle control device 10 is a device that controls a vehicle using the imaginary line 82.

Configuration of the Vehicle Control Device 10 and the Road Environment Recognition Device 12

Figure 2:
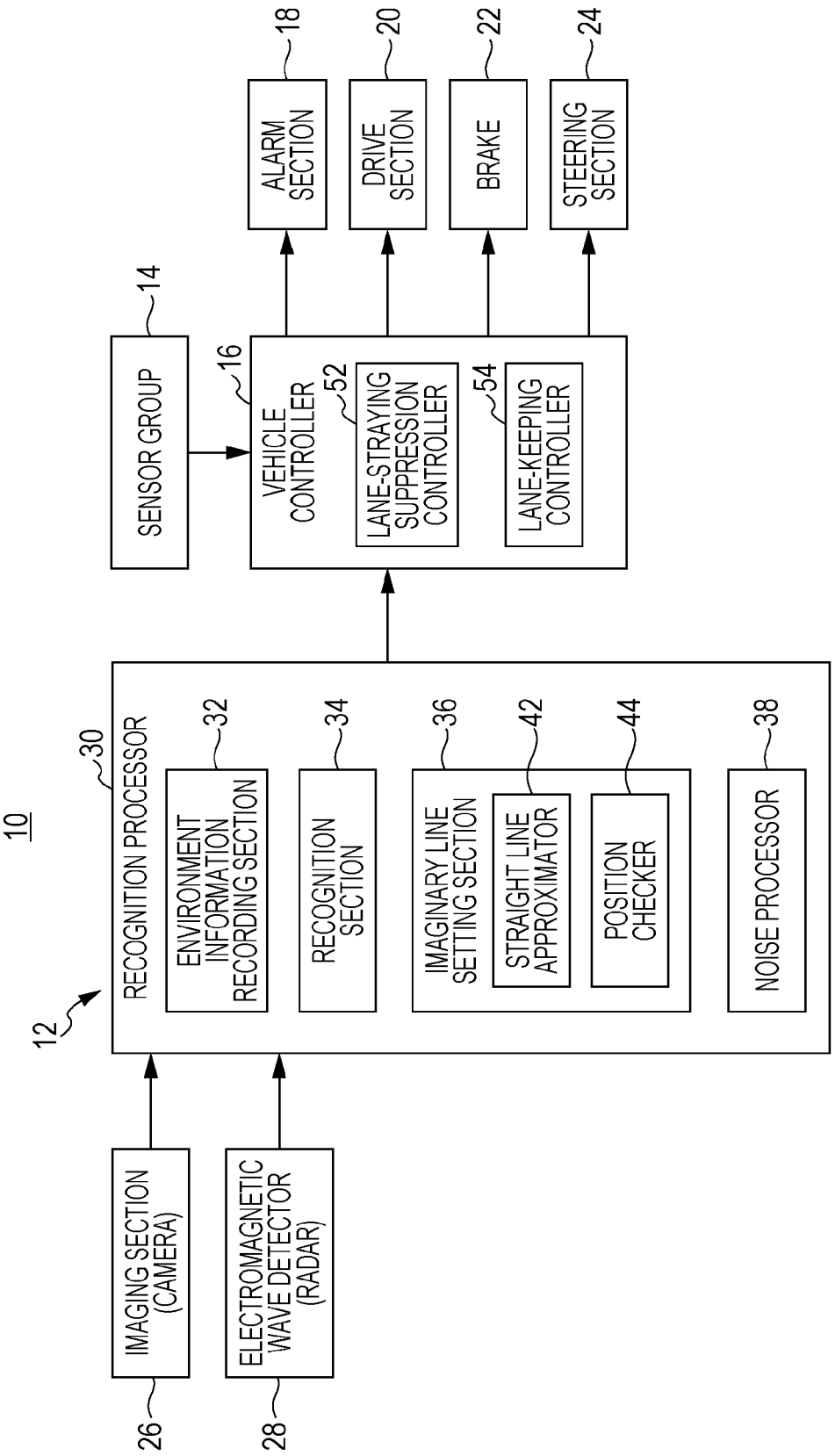
FIG. 2 is a functional block diagram of a vehicle control device and a road environment recognition device according to an embodiment.

Explanation follows regarding a configuration of the vehicle control device 10 and the road environment recognition device 12, with reference to FIG. 2. The vehicle control device 10 includes the road environment recognition device 12 that recognizes the road environment in front of the vehicle, a sensor group 14 that detects information regarding vehicle behavior, a vehicle controller 16 that controls the vehicle, an alarm section 18 that is actuated on receipt of an alarm command issued by the vehicle controller 16, a drive section 20 that is actuated on receipt of an acceleration command issued by the vehicle controller 16, a brake 22 that actuates on receipt of a braking command issued by the vehicle controller 16, and a steering section 24 that actuates on receipt of a steering command issued by the vehicle controller 16.

The road environment recognition device 12 includes an imaging section 26 that images in front of a vehicle, and an electromagnetic wave detector 28 that radiates electromagnetic waves in front of a vehicle and detects the reflected waves. The road environment recognition device 12 also includes a recognition processor 30 that uses image information 60 (see FIG. 1) imaged by the imaging section 26 and reflected wave information 60a (see FIG. 1) detected by the electromagnetic wave detector 28 to execute a series of recognition processing and to set the imaginary line 82.

The imaging section 26 is configured by a camera, such as an SLR camera or a stereo camera. The camera is, for example, installed at an upper portion of the inside face of a windshield. The camera images the road environment in front of a vehicle (such as the lane markers 74, 76, 78, the three dimensional object 72, and the guardrail 80) and acquires the image information 60.

The electromagnetic wave detector 28 is configured by a radar, such as a millimeter radar, a microwave radar, or a laser radar, and an infrared sensor (hereinafter collectively referred to as radar). The radar is provided, for example, inside a front grille. The radar radiates electromagnetic waves onto the road environment in front of a vehicle, and acquires positional information of the reflected waves 60a that have been reflected by the three dimensional object 72 and the guardrail 80 (referred to below as reflected wave information). The radar is capable of detecting the three dimensional object 72 and the guardrail 80 present up to a specific distance L.

The recognition processor 30 is configured by an ECU. The ECU is a calculation machine including a microcomputer, and includes a central processing unit (CPU), ROM (including EEPROM) memory, random access memory (RAM), and also input-output devices such as an A/D convertor or D/A convertor. By the CPU reading and executing a program stored in the ROM, the ECU functions as a multi-function implementation section, for example as various types of controller, arithmetic section, and processor. The ECU configuring the recognition processor 30 in the present embodiment functions as an environment information recording section 32, a recognition section 34, an imaginary line setting section 36, and a noise processor 38. The ECU may be divided into plural ECUs, or may be integrated together with another ECU.

The environment information recording section 32 is configured so as to store the image information 60 acquired by the imaging section 26 and the reflected wave information 60a acquired by the electromagnetic wave detector 28 in memory.

The recognition section 34 recognizes the road environment, this being the three dimensional object 72, the guardrail 80, and the lane markers 76, 78, in the image information 60 and the reflected wave information 60a stored in the environment information recording section 32. For example, the recognition section 34 binarizes the image information 60, and extracts edge points 82a, 82b to be recognized as lane markers 76, 78. Moreover, the recognition section 34 also extracts plural radar points 84a, 84b, 84c that lie in a row along a straight line in the reflected wave information 60a to be recognized as the three dimensional object 72. The recognition section 34 is also able to recognize the road environment by a fusion of the image information 60 and the reflected wave information 60a.

Figure 3:
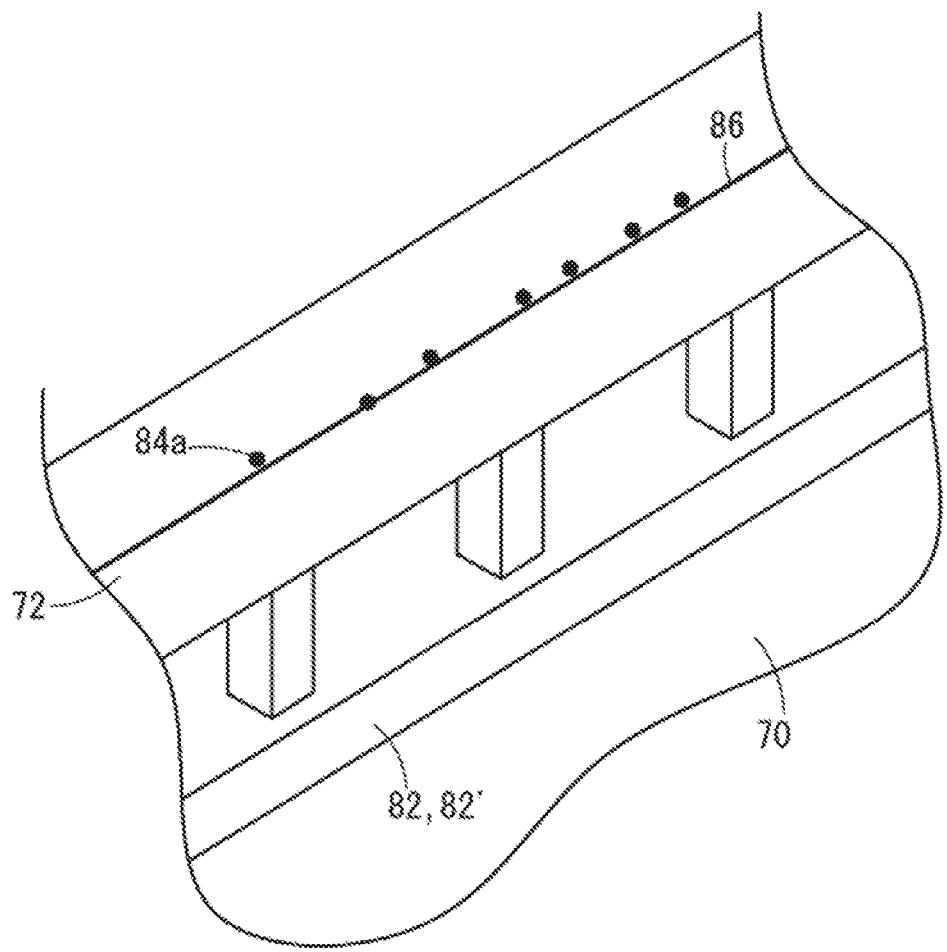
FIG. 3 is an explanatory diagram of straight line approximation using radar points.

The imaginary line setting section 36 includes a straight line approximator 42 and a position checker 44. As illustrated in FIG. 3, the straight line approximator 42 approximates plural radar points, such as the radar points 84a, extracted from the reflected wave information 60a to a straight line, and finds a first straight line 86 on the three dimensional object 72. Moreover, the straight line approximator 42 also finds the imaginary line 82 based on the first straight line 86. The position checker 44 checks the position of the imaginary line 82 based on the position of the guardrail 80 facing the three dimensional object 72 across the lane 70, and the position of the lane markers 76, 78 provided on the opposite side of the lane 70 to the three dimensional object 72. The position checker 44 corrects the position of the imaginary line 82 when the position of the imaginary line 82 is not appropriate.

The noise processor 38 treats any road environment information that is present on the opposite side of the imaginary line 82 and the three dimensional object 72 as being noise. The noise is excluded from recognition.

The sensor group 14 is configured including a vehicle speed sensor that detects the speed of the vehicle, a steering angle sensor that detects the steering angle of the steering wheel, a torque sensor that detects torque occurring in a steering shaft, and a navigation device and gyro sensor that detect the position of the vehicle. The detected information from each of the sensors is transmitted to the vehicle controller 16.

The vehicle controller 16 is configured by an ECU. The vehicle controller 16 functions as a lane-straying suppression controller 52 and a lane-keeping controller 54. The lane-straying suppression controller 52 is configured to take precautions against the vehicle straying over the imaginary line 82 by issuing, for example, a warning command, a deceleration command, or a steering command when the vehicle is predicted to stray over the imaginary line 82. The lane-keeping controller 54 is configured so as to issue a steering command such that the vehicle keeps running alongside the imaginary line 82.

The alarm section 18, the drive section 20, the brake 22, and the steering section 24 are collectively configured by the ECU. The alarm section 18 displays a warning on a display inside the vehicle and/or issues a warning sound using a speaker according to the warning command issued by the vehicle controller 16. The drive section 20 actuates a drive source of the vehicle according to an acceleration command issued by the vehicle controller 16. A throttle valve or the like is actuated in response to an acceleration command when the vehicle is a vehicle with an engine, actuating the drive source (the engine). In cases in which the vehicle is an electric vehicle including an electric motor, the drive source (the electric motor) is actuated in response to the acceleration command. The brake 22 actuates a brake actuator in response to a braking command issued by the vehicle controller 16, thereby actuating braking. The steering section 24 actuates the motor of electrical power-assisted steering in response to a warning command and a steering command issued by the vehicle controller 16. The motor causes the steering shaft to vibrate or rotate.

Processing of the Vehicle Control Device 10 and the Road Environment Recognition Device 12

Figure 4:
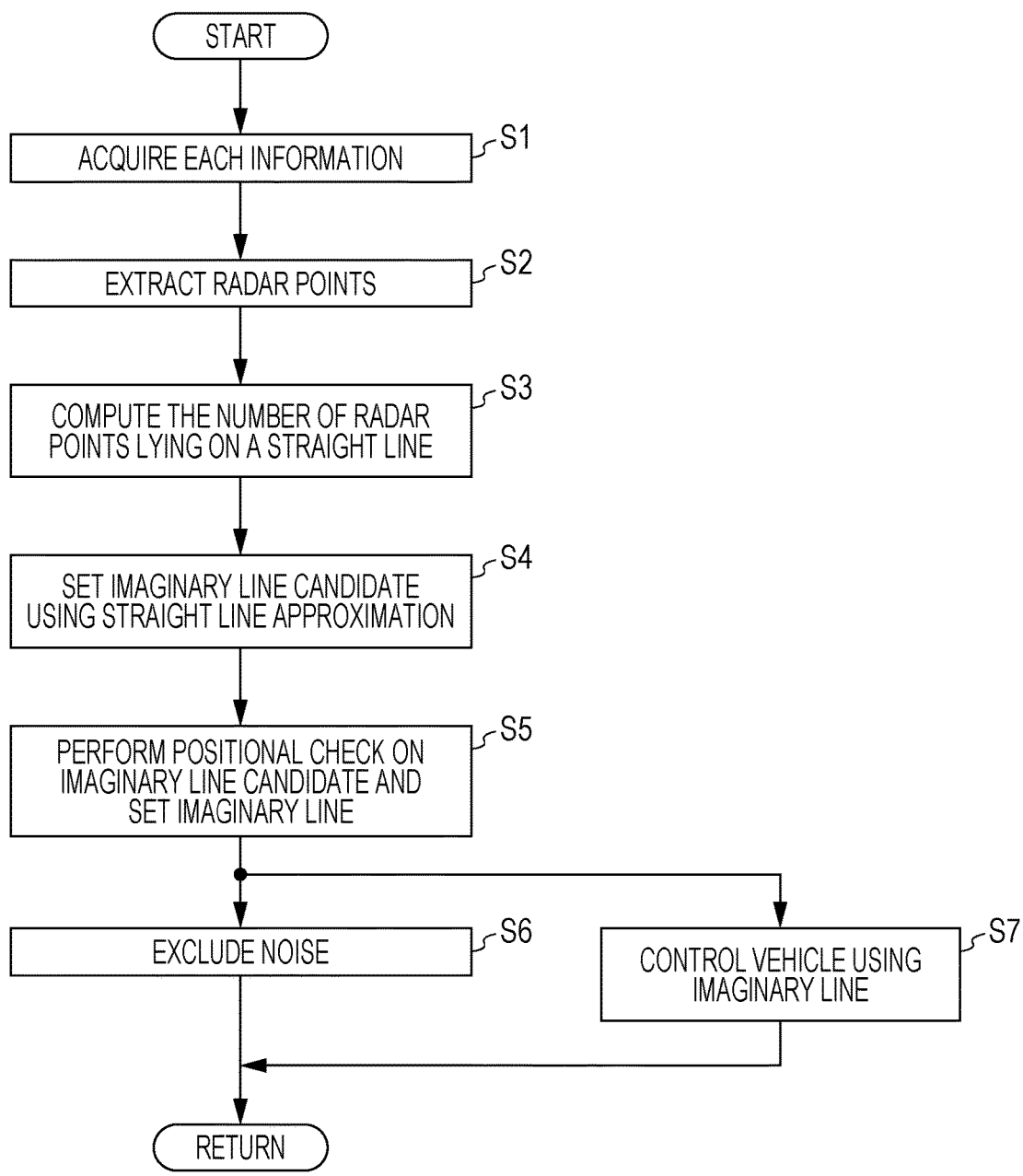
FIG. 4 is a flowchart of processing performed with a vehicle control device and a road environment recognition device.

Explanation follows regarding processing performed by the vehicle control device 10 and the road environment recognition device 12, with reference to FIG. 4. The processing illustrated in FIG. 4 is continuously performed every specific period of time, for example, every extremely short period of time, of the order of milliseconds.

At step S1, the imaging section 26 acquires the image information 60 from in front of the vehicle, and the electromagnetic wave detector 28 radiates electromagnetic waves in front of the vehicle, and acquires the reflected wave information 60*a*. The environment information recording section 32 stores the acquired image information 60 and the reflected wave information 60*a*.

At step S2, the recognition section 34 extracts radar points (reflection point positions) from the reflected wave information 60*a* stored in the environment information recording section 32. When doing so, the recognition section 34 extracts sequences of points forming rows from the vehicle side (the lower side in FIG. 1) to the far side of the lane 70 (the upper side in FIG. 1). When this is performed, as well as the radar points 84*a*, 84*b*, 84*c* of the three dimensional object 72 provided alongside the lane 70, the recognition section 34 also extracts the radar points of other three dimensional bodies, such as the guardrail 80. Since, at this stage, the radar points are not connected together, the shapes of the three dimensional object 72 and the guardrail 80 are not recognizable.

The recognition section 34 recognizes the lane markers 76, 78 provided alongside the lane 70. The three dimensional object 72 has line symmetry to the lane markers 76, 78, about an axis of symmetry of substantially the center line of the lane 70. The recognition section 34 accordingly determines that sequences of points that have no line symmetry to the lane markers 76, 78 have no relationship to the three dimensional object 72, and excludes these points from being subject to extraction. When the distance from the lane markers 76, 78 to the three dimensional object 72 has been determined, the recognition section 34 determines points at this distance away from the lane markers 76, 78 or greater, for example, edge points of the lane marker 74, as having no relationship to the three dimensional object 72, and excludes these points from being subject to extraction.

At step S3, the recognition section 34 computes the number of radar points 84*a*, 84*b*, 84*c* lying on a straight line from out of the plural extracted radar points 84*a*, 84*b*, 84*c*. When the number of radar points lying on a straight line number a specific number or greater, in this case, when plural of the radar points 84*a* can be confirmed, each of the radar points 84*a* is determined as having the same height on the same three dimensional object 72. The recognition section 34 extracts the radar points 84*a* that lie on a straight line and number the specific number or greater. Note that the radar points 84*b*, 84*c* that lie on a straight line and number the specific number or greater may also be extracted.

At step S4, as illustrated in FIG. 3, the straight line approximator 42 employs the radar points 84*a* that lie on a straight line and number the specific number or greater to perform straight line approximation using a least sum of squares method or the like, and sets the first straight line 86 on the three dimensional object 72. Moreover, the straight line approximator 42 also sets an imaginary line candidate 82' at a position on the surface of the lane 70 lying on the lane 70 side and separated from the first straight line 86 by a first distance. The width of the imaginary line candidate 82' is the same as the width of an ordinary lane marker.

The recognition section 34 recognizes installation points 88 of the guardrail 80 in the image information 60 or the reflected wave information 60*a*. The straight line approximator 42 employs the installation points 88 that lie on a straight line and number the specific number or greater to perform straight line approximation using a least sum of squares method or the like, and sets a second straight line 90 along the installation points 88 of the guardrail 80.

At step S5, the position checker 44 checks the position of the imaginary line candidate 82' set by the straight line approximator 42. For example, when the separation distance between the three dimensional object 72 and the guardrail 80 (a second distance) has been determined, the position checker 44 shifts the second straight line 90 on the guardrail 80 side toward the imaginary line candidate 82' side by the second distance, and checks the degree of overlap between the two lines. The imaginary line candidate 82' is treated as an authoritative imaginary line 82 when misalignment between the two lines is within a permissible range. However, the imaginary line candidate 82' is corrected when misalignment between the two lines is exceeds the permissible range. For example, an intermediate line is found between the imaginary line candidate 82' and the second straight line 90, shifted to the imaginary line candidate 82' side, and the intermediate line is treated as the authoritative imaginary line 82. This found imaginary line 82 is treated as a lane marker. The extension direction of the imaginary line 82 is substantially matched to the extension direction of the lane 70.

Moreover, when a separation distance between the three dimensional object 72 and the lane markers 76, 78 (a third distance) has been determined, the lane markers 76, 78 are shifted to the imaginary line candidate 82' side by the third distance, and the degree of overlap between the two lines may also be checked. The imaginary line candidate 82' may also be corrected when this is performed.

Moreover, by checking the symmetry between the imaginary line candidate 82', and the second straight line 90 and/or the lane markers 76, 78, the position of the imaginary line candidate 82' may also be checked. The imaginary line candidate 82' may also be corrected when this is performed.

At step S5, the imaginary line 82, namely, the imaginary lane marker, is set, and the processing of step S6, and the processing of step S7 are performed.

At step S6, the noise processor 38 treats as noise the radar points of any three dimensional bodies present in the image information 60 and the reflected wave information 60*a* outside the three dimensional object 72 and edge points of the lane marker 74. For example, the first straight line 86 is employed as the boundary between the inside and the outside.

At step S7, the vehicle controller 16 performs vehicle control that employs the imaginary line 82. The vehicle controller 16 performs at least one of lane-straying suppression control using the lane-straying suppression controller 52, or lane-keeping control using the lane-keeping controller 54.

The lane-straying suppression controller 52 predicts the direction of progress of the vehicle over a specific period of time using information from the sensor group 14 (steering angle sensor, navigation device, gyro-sensors etc.). The lane-straying suppression controller 52 then takes precautions, such as the following, against the vehicle straying over the imaginary line 82 in cases in which the vehicle is predicted to stray over the imaginary line 82 unless a direction instruction device is actuated.

First, the lane-straying suppression controller 52 outputs a warning command to the alarm section 18 and the steering section 24. The alarm section 18 displays a warning on the display inside the vehicle, and issues a warning sound using the speaker. The steering section 24 actuates the motor of the electrical power-assisted steering, and vibrates the steering shaft and steering wheel. The lane-straying suppression controller 52 accordingly notifies the driver of lane-straying using the alarm section 18.

The lane-straying suppression controller 52 then outputs a steering command to the steering section 24. The steering section 24 actuates the motor of the electrical power-assisted steering, and so as to cause the steering shaft and steering wheel to swing in the direction of return to the lane 70. The lane-straying suppression controller 52 accordingly assists or automatically controls the steering through the steering section 24.

If the vehicle is predicted to stray over the imaginary line 82 to a large extent, the lane-straying suppression controller 52 issues a deceleration command to the brake 22. The brake 22 actuates the brake actuator so as to actuate the brakes. The lane-straying suppression controller 52 accordingly reduces the speed of the vehicle using the brake 22.

The lane-keeping controller 54 issues a steering command to the steering section 24 so as to travel within a specific range between the imaginary line 82 and the lane marker 76. The steering section 24 actuates the motor of the electrical power-assisted steering, so as to cause the steering shaft to swing.

Overview Regarding the First Embodiment

The road environment recognition device 12 according to the present embodiment includes the recognition section 34 that recognizes the three dimensional object 72 provided alongside the lane 70 in which the vehicle is positioned, and the imaginary line setting section 36 that sets the imaginary line 82 based on the three dimensional object 72 recognized by the recognition section 34, and treats the imaginary line 82 as a lane marker.

According to the road environment recognition device 12 according to the present embodiment, the imaginary line 82 is set based on the three dimensional object 72 provided alongside the lane 70 in which the vehicle is positioned, and the imaginary line 82 is treated as a lane marker. This thereby enables a lane marker (the imaginary line 82) to be recognized on a road provided, at the boundary to the lane 70, with the three dimensional object 72 but not provided with a lane marker, enabling vehicle control using lane markers on such roads.

The road environment recognition device 12 according to the present embodiment also includes the imaging section 26 that images in front of the vehicle. The recognition section 34 uses the image information 60 imaged by the imaging section 26 to recognize the three dimensional object 72. The imaging section 26 is excellent at detecting the lane markers 76, 78, and is capable of recognizing the lane markers 76, 78 provided on one side of the lane 70 with high precision. The present embodiment is capable of performing high precision vehicle control using the lane markers 76, 78 provided at one side of the lane 70 and the lane marker (the imaginary line 82) set at the other side of the lane 70.

The road environment recognition device 12 according to the present embodiment also includes the electromagnetic wave detector 28 that radiates electromagnetic waves in front of the vehicle and detects the reflected waves. The recognition section 34 recognizes the three dimensional object 72 using the image information 60 and the reflected wave information 60*a* detected with the electromagnetic wave detector 28. The electromagnetic wave detector 28 is excellent at detecting the three dimensional object 72, and is capable of setting the imaginary line 82 with high precision. The present embodiment is capable of performing high precision vehicle control using the lane markers 76, 78 provided at one side of the lane 70 and the lane marker (the imaginary line 82) set at the other side of the lane 70.

In the road environment recognition device 12 according to the present embodiment, the recognition section 34 excludes any other three dimensional bodies present outside of the three dimensional object 72 from being subject to recognition. The present embodiment enables the processing load for recognition to be lightened by reducing the scope subject to recognition.

In the road environment recognition device 12 according to the present embodiment, in cases in which the guardrail 80 is provided facing the three dimensional object 72 across the lane 70, the recognition section 34 recognizes the plural radar points (three dimensional body points) 84*a* included in the three dimensional object 72, and also recognizes the plural installation points 88 included in the guardrail 80. The imaginary line setting section 36 finds the first straight line 86 by straight line approximation using the radar points (three dimensional object points) 84*a*, and sets the imaginary line candidate 82' at a position a first distance away from the first straight line 86 on the lane 70 side. The imaginary line setting section 36 also finds the second straight line 90 by straight line approximation using the installation points 88, moves the second straight line 90 to the imaginary line candidate 82' side by a second distance, and corrects the imaginary line candidate 82' using the moved second straight line 90 to set the imaginary line 82. The present application is able to set the imaginary line 82 with high precision due to correcting the imaginary line candidate 82' using the guardrail 80, which is different from the three dimensional object 72.

In the road environment recognition device 12 according to the present embodiment, in cases in which other lane markers 76, 78 are provided to the lane 70, the recognition section 34 recognizes the other lane markers 76, 78. The imaginary line setting section 36 also moves the other lane markers 76, 78 by a third distance toward the imaginary line candidate 82' side, and corrects the imaginary line candidate 82' using the moved other lane markers 76, 78 to set the imaginary line 82. The present embodiment is able to set the imaginary line 82 with high precision due to correcting the imaginary line candidate 82' using the lane markers 76, 78 provided in the lane 70.

In the road environment recognition device 12 according to the present embodiment, in cases in which the other lane markers 76, 78 are provided to the lane 70, the recognition section 34 recognizes the other lane markers 76, 78, and the imaginary line setting section 36 excludes information of any straight lines that are not symmetrical to the other lane markers 76, 78, or of any straight lines that are further away from the other lane markers 76, 78 than the distance between the other lane markers 76, 78 and the three dimensional object 72. The present embodiment is able to quickly set the imaginary line 82 due to excluding unrelated information when setting the imaginary line 82.

The vehicle control device 10 according to the present embodiment includes the vehicle controller 16 that predicts the direction of progress of the vehicle, and, in cases in which the vehicle is predicted to stray over the imaginary line 82, takes precautions against the vehicle straying over the imaginary line 82, and/or makes the vehicle travel alongside the imaginary line 82. The present embodiment enables vehicle control using a lane marker (the imaginary line 82) on a road provided, at the boundary to the lane 70, with the three dimensional object 72 but not provided with a lane marker.

The vehicle control method according to the present embodiment includes the following processes. A recognition process (steps S1 to S3) of acquiring the image information 60 imaged in front of the vehicle, radiating electromagnetic waves in front of the vehicle and acquiring the reflected wave information 60a, and using the image information 60 and the reflected wave information 60a to recognize the three dimensional object 72 provided alongside the lane 70 in which the vehicle is positioned. An imaginary line setting process (step S4, step S5) of setting the imaginary line 82 based on the three dimensional object 72 recognized by the recognition process, and treating the imaginary line 82 as a lane marker. A vehicle control process (step S7) of predicting the direction of progress of the vehicle, and, in cases in which the vehicle is predicted to stray over the imaginary line 82, taking precautions against the vehicle straying over the imaginary line 82, and/or making the vehicle travel alongside the imaginary line 82. Moreover, in the recognition process, other three dimensional bodies present outside the three dimensional object 72 is excluded from being subject to recognition (step S6). The present embodiment enables vehicle control using a lane marker (the imaginary line 82) on a road provided, at the boundary to the lane 70, with the three dimensional object 72 but not provided with a lane marker.

In the vehicle control method according to the present embodiment, in cases in which the guardrail 80 is provided facing the three dimensional object 72 across the lane 70, and the other lane markers 76, 78 are provided to the lane 70, in the recognition process (step S1 to step S3), the plural radar points (three dimensional object points) 84a included in the three dimensional object 72 are recognized, the plural installation points 88 included in the guardrail 80 are recognized, and the other lane markers 76, 78 are recognized. In the imaginary line setting process (step S4, step S5), the first straight line 86 is found by straight line approximation using the radar points (three dimensional object points such as a series of points recognizably and sequentially appearing on the object 72 along the lane direction) 84a, and the imaginary line candidate 82' is set at a position the first distance away from the first straight line 86 on the lane 70 side. The second straight line 90 is also found by straight line approximation using the installation points 88, and the second straight line 90 is moved by the second distance toward the imaginary line candidate 82' side. The other lane markers 76, 78 are also moved by the third distance to the imaginary line candidate 82' side. The imaginary line candidate 82' is then corrected using the moved second straight line 90 and the moved other lane markers 76, 78, so as to set the imaginary line 82. The present embodiment can increase the precision of vehicle control due to being able to set the imaginary line with high precision.

Modified Examples

In the above embodiment, the imaginary line 82 is set using the image information 60 and the reflected wave information 60a acquired at a single time. However, the image information 60 and the reflected wave information 60a acquired at plural times may be used. Modified examples will now be explained, with reference to FIGS. 2, 4, and 5.

Figure 5:
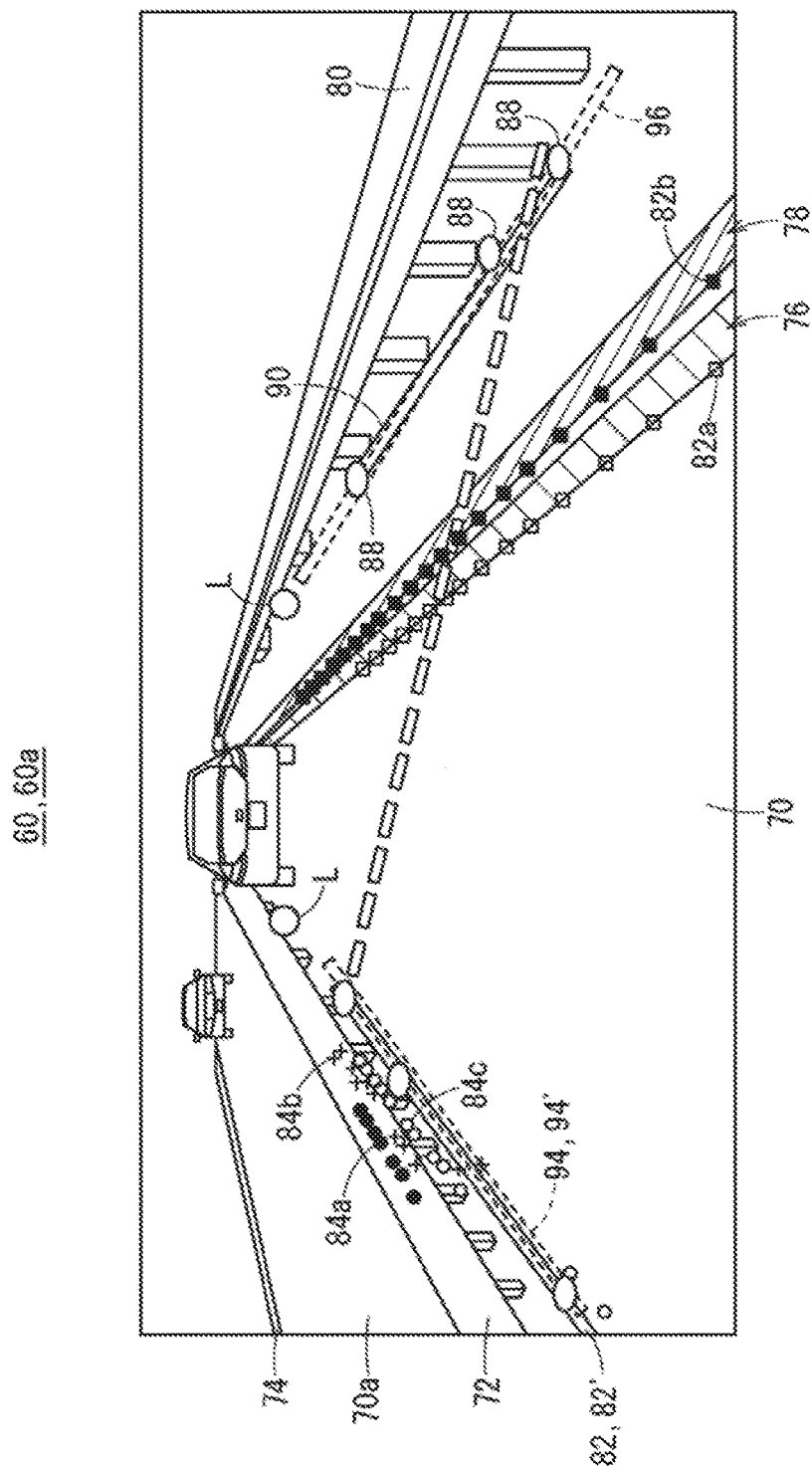
FIG. 5 is an explanatory diagram of image information and reflected wave information in a road environment at plural times.

The recognition section 34 performs processing of step S2 and step S3 illustrated in FIG. 4 using image information 60 and reflected wave information 60a acquired at each of times t1, . . . , tn. A straight line approximator 42 performs straight line approximation with a least sum of squares method or the like using radar points acquired at each of the times t1, . . . , tn, and sets a first straight line on a three dimensional object 72. As illustrated in FIG. 5, the straight line approximator 42 sets an imaginary line candidate 94' that is parallel to the first straight line and at a position the first distance away from the first straight line on the lane 70 side. In FIG. 5, an imaginary line candidate 82' found based on the image information 60 or the reflected wave information 60a acquired at a single time is illustrated with a solid line, and the imaginary line candidate 94' found based on the image information 60 or the reflected wave information 60a acquired at plural times is illustrated with an intermittent line.

The recognition section 34 recognizes installation points 88 of a guardrail 80 present in the image information 60 or the reflected wave information 60a acquired at plural times. The straight line approximator 42 performs straight line approximation with a least sum of squares method or the like using the installation points 88 that are present in a row on a straight line at a specific number of points or greater, and sets a second straight line 96 on the installation points 88 of the guardrail 80. In FIG. 5, the second straight line 90 found based on the image information 60 or the reflected wave information 60a acquired at a single time is illustrated by a solid line, and the second straight line 96 found based on the image information 60 or the reflected wave information 60a acquired at plural times is illustrated by an intermittent line.

At step S5 of FIG. 4, the position checker 44 checks the imaginary line candidate 94' using the second straight line 96, and treats the imaginary line candidate 94' as an authoritative imaginary line 94 when both lines are within a permissible range. However, when both lines are outside of the permissible range, the position checker 44 corrects the imaginary line candidate 94', and treats the corrected imaginary line candidate 94' as the authoritative imaginary line 94.

This modified example enables a stable imaginary line 94 to be set due to using the information acquired at plural times.

Other Embodiments

The present application is not limited to the above embodiments, and obviously various configurations may be employed within a range not departing from the spirit of the present application. For example, the imaging section 26 may be provided alone, and the electromagnetic wave detector 28 not employed.

Regarding the straight line found by the straight line approximator 42 as the imaginary line candidate 82', it is not necessary to perform a positional check on the imaginary line candidate 82' using the position checker 44. In such cases, the straight line approximator 42 sets the imaginary line 82 at a position on the surface of the lane 70 the first distance away from the first straight line 86 on the lane 70 side.

What is claimed is:

1. A vehicle control device for controlling driving of a vehicle based on recognition of a lane marker existing in a road environment in front of the vehicle driving on a lane, the vehicle control device comprising:
- a vehicle controller;
- a recognition section configured to recognize a three dimensional object provided alongside the lane in which the vehicle is positioned; and
- an imaginary line setting section configured to set an imaginary line based on the three dimensional object recognized by the recognition section and to treat the imaginary line as the lane marker, wherein, when the road environment includes a guardrail provided facing the three dimensional object in a direction across the lane, the recognition section recognizes a plurality of three dimensional object points existing in the three dimensional object and recognizes a plurality of installation points included in the guardrail, and the imaginary line setting section configured to:
- find a first straight line based on an approximate straight line connecting the three dimensional object points;
- setting an imaginary line candidate at a position a first distance away from the first straight line toward a side of the vehicle, which is the position between the three dimensional object and the vehicle;
- finding a second straight line based on an approximate straight line connecting the installation points;
- moving the second straight line by a second distance to the imaginary line candidate side in the direction across the lane; and
- correcting the position of the imaginary line candidate based on the moved second straight line so as to set the imaginary line, and the vehicle controller is configured to control the driving of the vehicle based on the corrected imaginary line recognized as the lane marker.

2. The vehicle control device according to claim 1, wherein, when the road environment further includes another lane marker provided to the lane, the recognition section recognizes the another lane marker, and the imaginary line setting section moves the another lane marker by a third distance toward the imaginary line candidate side and further corrects the position of the imaginary line candidate which has been corrected based on the moved second straight line, based on the moved another lane marker so as to set the imaginary line.

3. The vehicle control device according to claim 1, wherein the vehicle controller is configured to:
- predict a direction of moving of the vehicle, and
- when the vehicle is predicted to stray over the imaginary line, perform at least one of: a control of the vehicle to avoid straying over the imaginary line; or a control of the vehicle to travel alongside the imaginary line.

4. A method of controlling driving of a vehicle based on recognition of a lane marker existing in a road environment in front of the vehicle driving on a lane utilizing a vehicle control device, the road environment including a three dimensional object and a guardrail provided facing the three dimensional object in a direction across the lane, the method comprising:

- recognizing a plurality of three dimensional object points existing in the three dimensional object and recognizing a plurality of installation points included in the guardrail;
- finding a first straight line based on an approximate straight line connecting the three dimensional object points;
- setting an imaginary line candidate at a position a first distance away from the first straight line toward a side of the vehicle, which is the position between the three dimensional object and the vehicle;
- finding a second straight line based on an approximate straight line connecting the installation points of the guardrail;
- moving the second straight line by a second distance to the imaginary line candidate side in the direction across the lane; and
- correcting the position of the imaginary line candidate based on the moved second straight line so as to set the imaginary line; and
- controlling the driving of the vehicle based on the corrected imaginary line recognized as the lane marker.

* * * * *